Dec. 22, 1953 A. F. HICKMAN 2,663,570
SPRING SUSPENSION FOR TANDEM AXLE TRUCKS
Filed Dec. 7, 1951 6 Sheets-Sheet 6
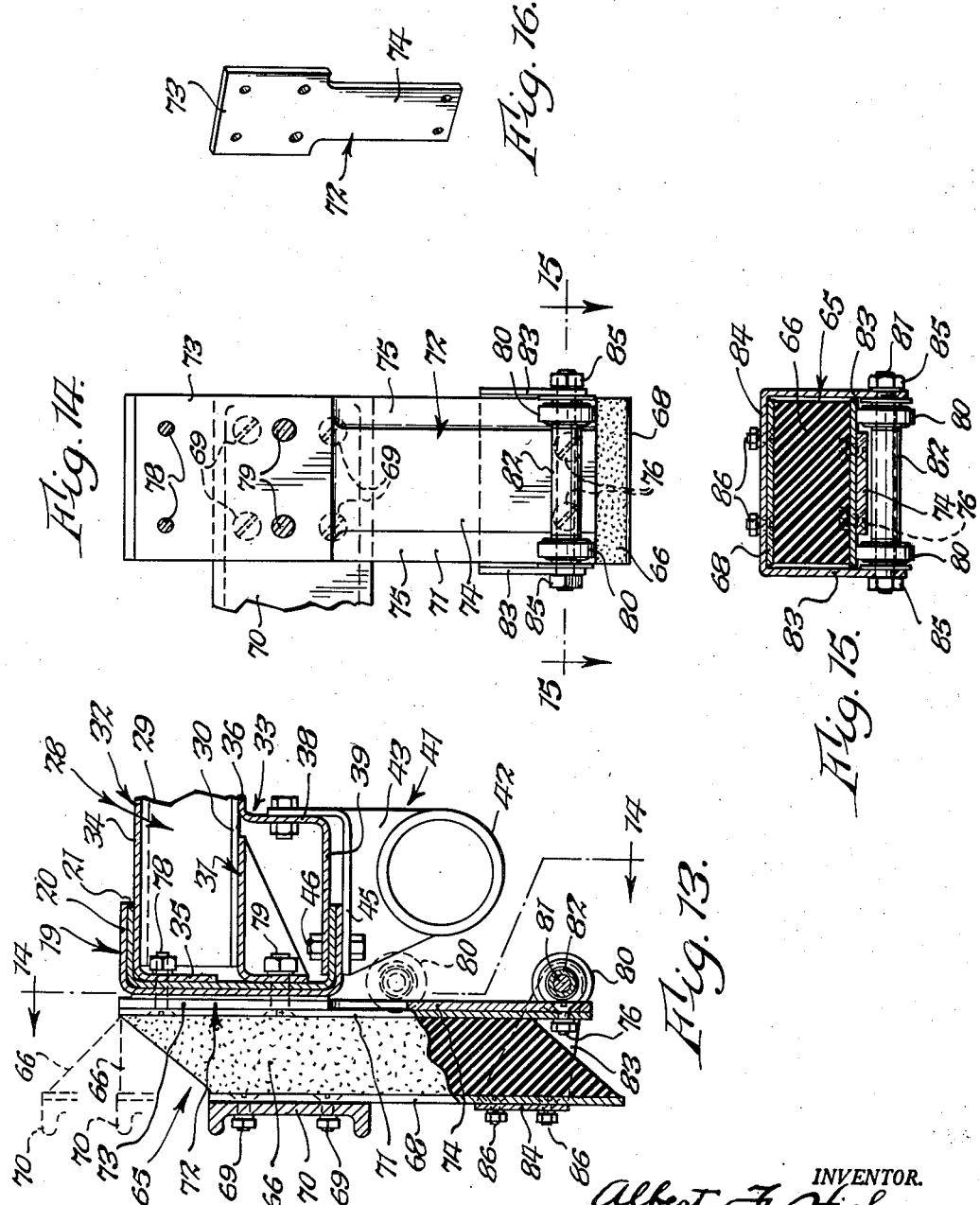

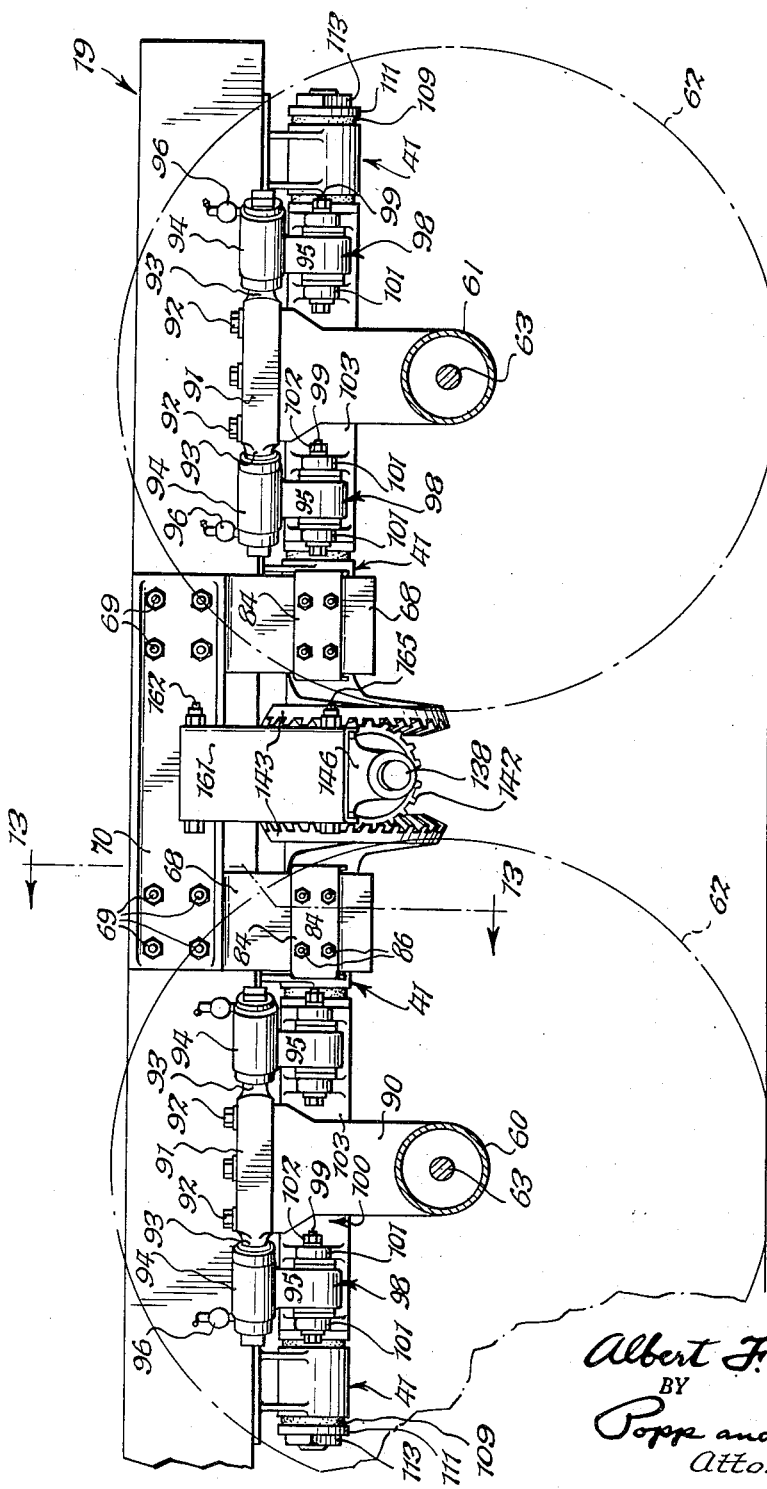

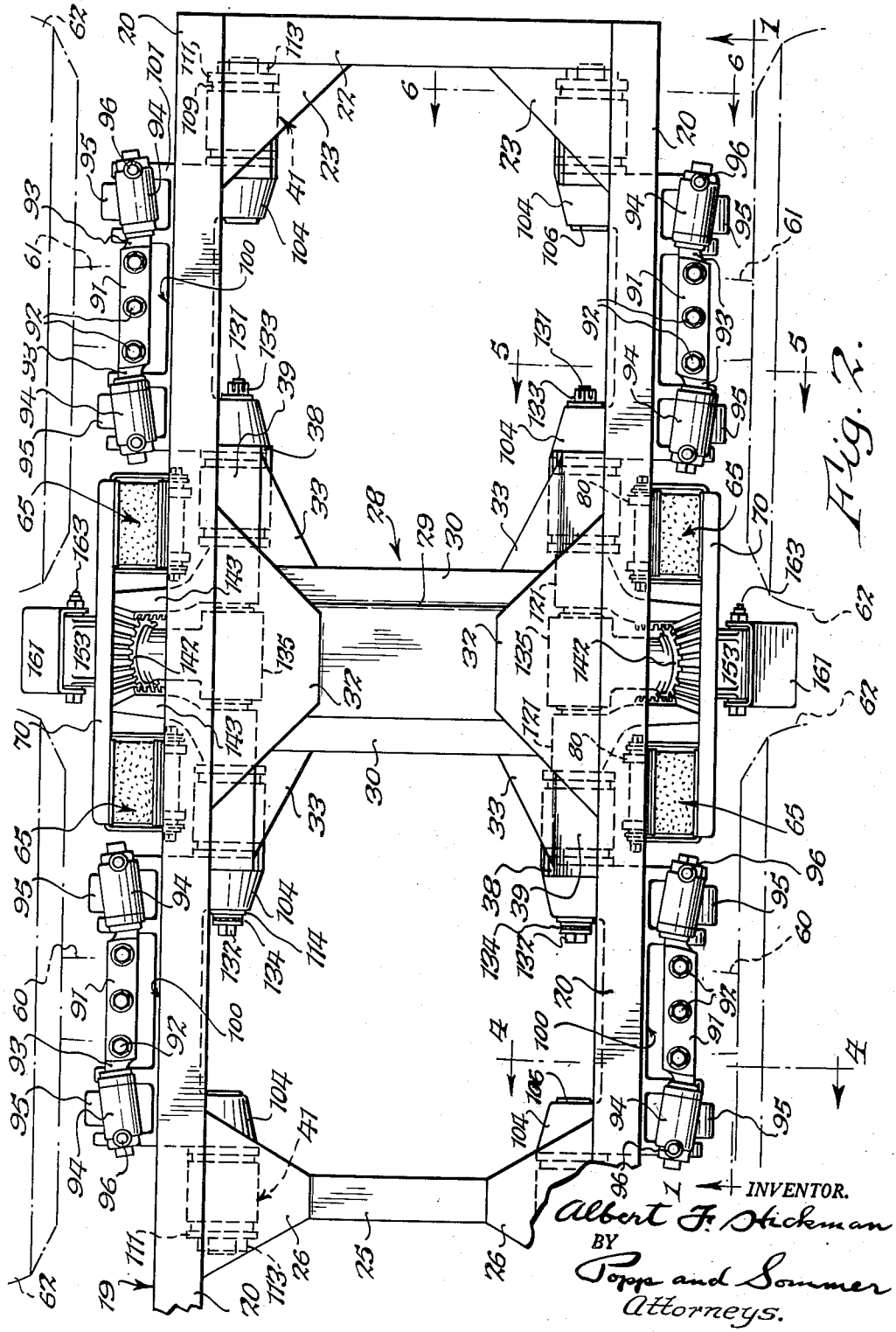

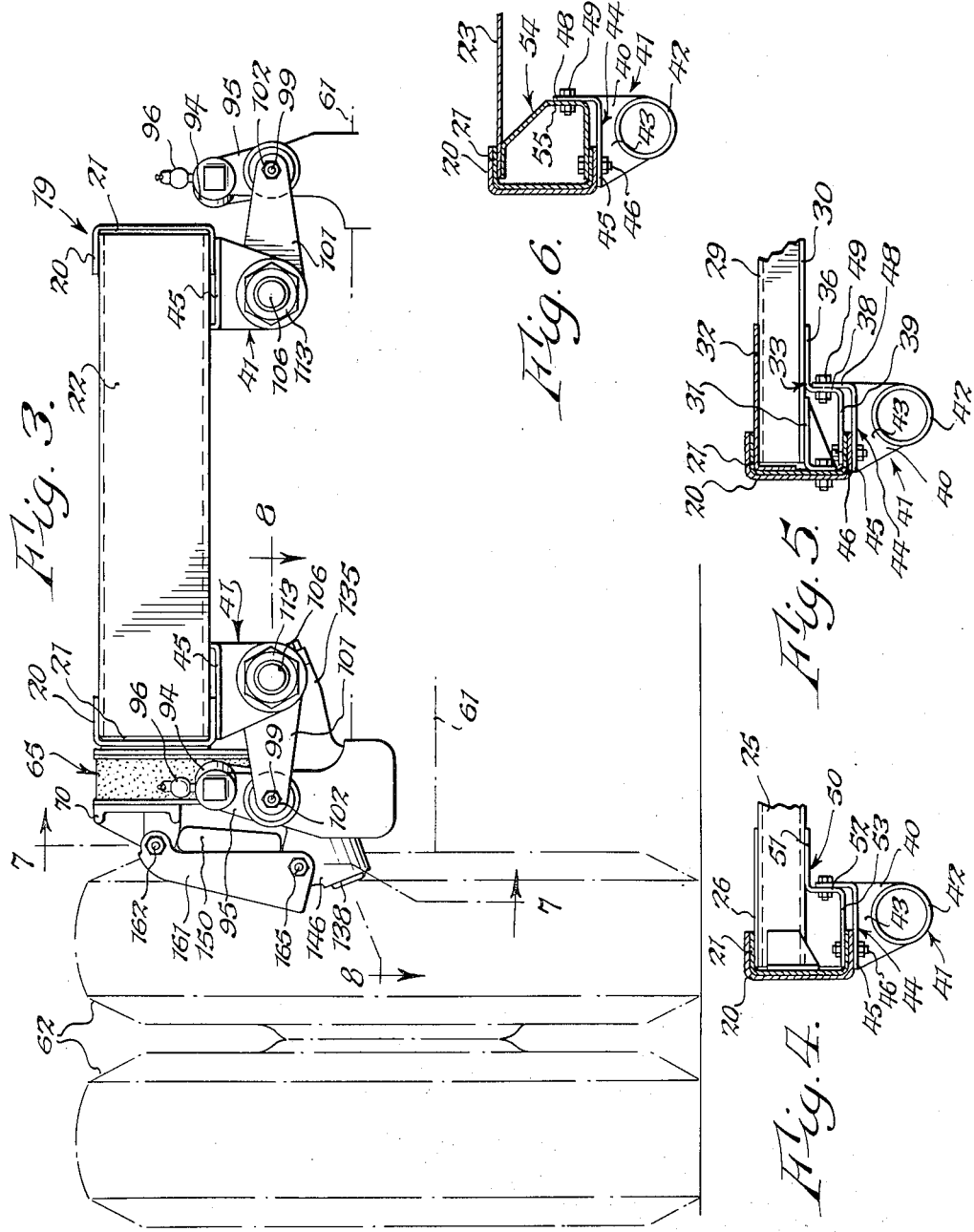

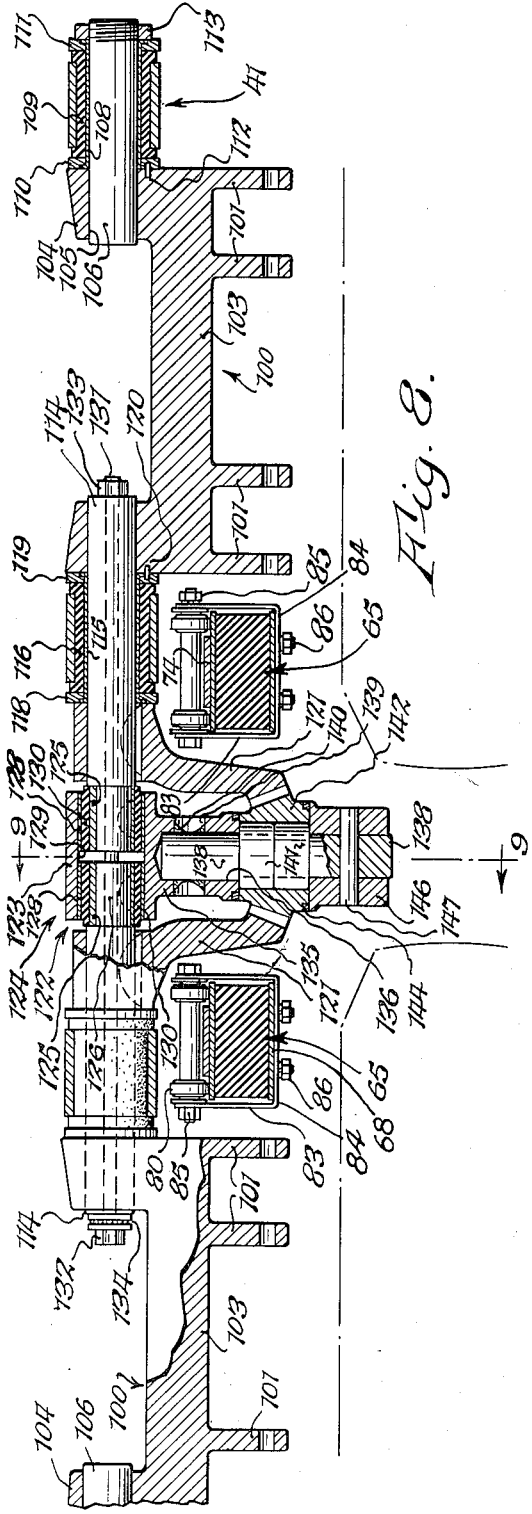
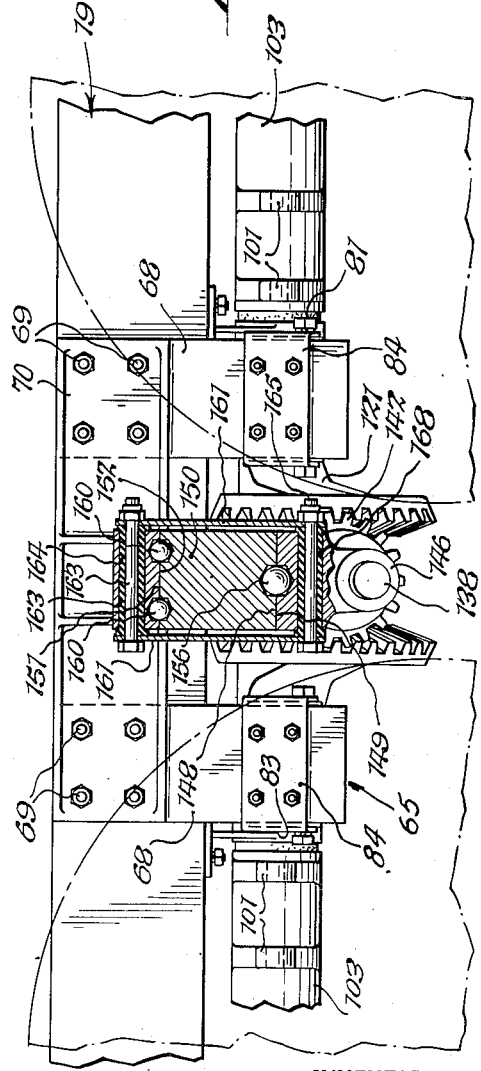

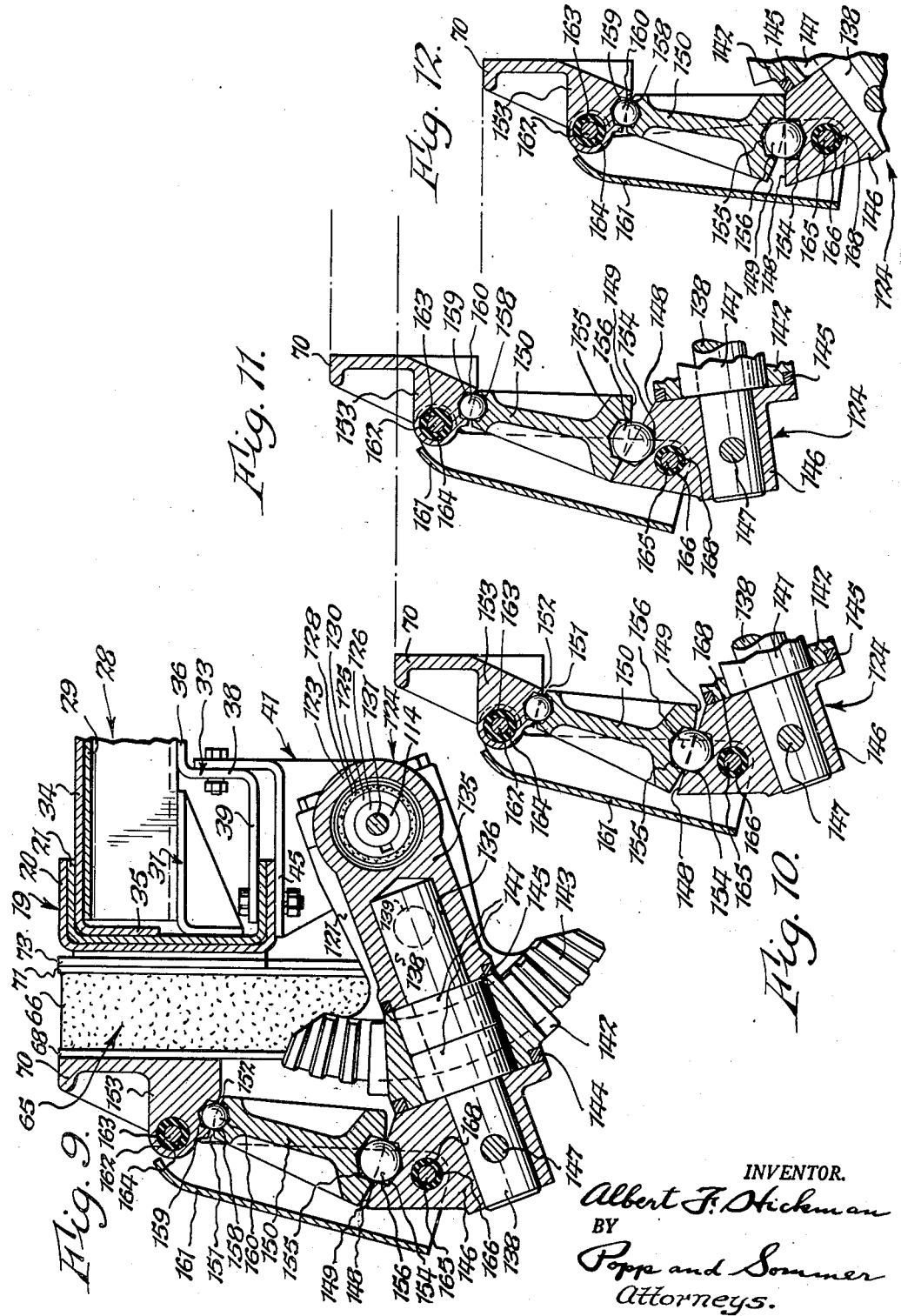

Patented Dec. 22, 1953

2,663,570

UNITED STATES PATENT OFFICE 2,663,570

SPRING SUSPENSION FOR TANDEM AXLE TRUCKS

Albert F. Hickman, Eden, N. Y.

Application December 7, 1951, Serial No. 260,462

14 Claims. (Cl. 280—104.5)

This invention relates to a spring suspension for tandem axle trucks in which the resiliency is provided by rubber springs of the shear rubber, rectilinear movement type.

One of the important objects of the present invention is to provide a shear rubber, rectilinear movement type of spring suspension for tandem axle vehicles which will permit the large amount of vertical axle movement necessary with highway vehicles to provide a vertical ride as soft as load heights will allow and at a low frequency, in the order of 105 to 110 cycles per minute at the rear end of conventional trucks when empty, and at a frequency close to 100 cycles per minute under full loads.

Another important object of the invention is to provide such a suspension which is substantially free from friction but is automatically controlled by an increasing resistance to motion in proportion to the amplitude of vertical frame and axle movement relative to each other.

Another object is to provide such a suspension in which lateral and vertical movement of the axles with reference to the vehicle frame are permitted and resiliently resisted, the lateral and vertical resilience being sufficient, both when the vehicle is loaded and unloaded, to absorb lateral thrust of the axle, particularly resulting from one wheel moving up and down, thereby to provide increased safety, tire and gasoline mileage, and stability, and without imposing undue end thrusts on the pivotal connections which connect the axles to the frame.

Another object is to provide such a suspension which includes compensating means connecting the companion ends of the tandem axles and through which the excess load on either axle is transmitted to the other axle and in which this compensating or load transfer means is in the form of a simple transmission arranged so that the total load on both axle ends is transmitted to a common spring support for each pair of axle ends, this spring support being of the rectilinear movement, shear rubber type.

Another object is to provide such a compensating or load transfer means in which the transfer of load from the tandem axles to the front axle of the vehicle, under braking reaction, is identical with the similar transfer of load in a two axle vehicle of the same wheel base, weight and load.

Another object is to provide such a suspension in which the distribution of the load to the body is at a plurality of well spaced points to reduce frame stresses.

Another object is to provide such a suspension in which side sway can be reduced to any desired amount.

Another object is to provide such a suspension in which periodic vibration of the suspension is dampened out and in which wheel tramp is avoided.

Another object is to provide such a suspension which is very light in weight, particularly in unsprung weight, as compared with conventional suspensions.

Another object is to provide such a suspension consisting of compact units which can be arranged without interference with the movement of the axles with respect to the frame and in which the parts are arranged inside the wheels and close to the wheels to provide high and wide pivot positions and increased stability.

Another object is to provide such a suspension which is simple in construction and is composed of low cost parts which can be readily taken down and repaired and which will stand up under conditions of severe and constant use with very little servicing.

Another object is to provide such a suspension which renders radius rods or auxiliary devices for the control of side sway, such as torsion bar stabilizers, unnecessary, and at the same time adequately resists all brake and drive torque reactions.

Another object is to provide such a suspension in which any desired frequency or degree of spring deflection can be obtained and which can be designed to have a long and variable spring resistance range in both vertical and lateral axle movements.

Another object is to provide such a suspension which will fit trucks having wide frames and large tires.

Another object is to provide such a tandem axle suspension in which the tandem axles are self-steering so that when rounding a curve the tandem axles are caused to assume such an angle relative to each other as will enable a pure rolling action to be obtained.

Another object is to provide a vehicle suspension which can be easily serviced and in particular in which the shackles of the suspension, which require the most frequent servicing, can be readily removed on jacking up the vehicle body and replaced with new or factory rebuilt shackles, thereby to avoid a difficult field operation and also to avoid withholding the truck from service for any great length of time.

Another object is to provide such a suspension employing rubber blocks or bodies in rectilinear shear and in which the bond stress of the rubber is kept within safe working limits.

Other objects and advantages of the invention will be apparent from the following description and drawings in which:

Fig. 1 is a side elevation of the rear end of a tandem axle vehicle having a suspension embodying the present invention, the axles and drive shafts being shown in a section taken along line 1—1 of Fig. 2.

Fig. 2 is a fragmentary top plan view of the suspension shown in Fig. 1.

Fig. 3 is a fragmentary rear elevational view thereof.

Figs. 4, 5 and 6 are vertical transverse sections taken on the correspondingly numbered lines of Fig. 2.

Fig. 7 is a fragmentary vertical section taken on line 7—7, Fig. 3.

Fig. 8 is a fragmentary horizontal section taken generally on line 8—8, Fig. 3.

Fig. 9 is an enlarged fragmentary vertical section taken on line 9—9, Fig. 8.

Figs. 10, 11 and 12 are fragmentary sections similar to Fig. 9 and showing the position of the parts under different load conditions, Fig. 10 showing the position of the parts when the vehicle is carrying a normal load; Fig. 11 showing the position of the parts when a severe bump in the road is encountered by the vehicle when fully loaded; and Fig. 12 showing the position of the parts when the vehicle is unloaded.

Fig. 13 is an enlarged vehicle transverse section taken generally on line 13—13, Fig. 1, parts being broken away, and this view showing by dotted lines successive positions of the parts when the vehicle is loaded and when the suspension is worked to its full capacity.

Fig. 14 is a vertical section taken generally on line 14—14, Fig. 13.

Fig. 15 is a horizontal section taken generally on line 15—15, Fig. 14.

Fig. 16 is a perspective view of one of the T-shaped backing plates used in connection with the suspension.

In the form of the invention illustrated in the drawings, the main frame 19 of the vehicle can be of any suitable construction and is shown as comprising a pair of longitudinal side frame bars in the form of inwardly facing channels 20 which are shown as straight and parallel and as provided with reinforcing channel liners 21 extending substantially the full length thereof. These channels 20 together with their liners 21 are shown as connected at their rear ends by a cross bar 22 of channel configuration and reinforced by horizontal triangular gusset plates 23. In advance of the tandem axles the longitudinal side frame bars 20, 21 are connected by a cross bar 25 and reinforced by horizontal triangular gusset plates 26. The cross bar 25 is preferably of rectangular tubular form in cross section.

The frame additionally includes a structure, indicated generally at 28, connecting the side frame bars 20, 21 and disposed midway between the tandem axles. This connecting structure is preferably constructed as follows:

The numeral 29 represents a main cross bar of U-shaped form in cross section with its downwardly projecting sides provided with horizontal flanges 30 projecting fore-and-aft of the vehicle. Each end of this U-shaped cross bar 29 is supported on the horizontal leg of an L-shaped supporting bracket 31, the vertical leg of which, as best shown in Fig. 13, is disposed against the face of the liner 21 for the corresponding channel 20 and secured to the liner 21 by welding or otherwise.

Each end of this U-shaped cross bar 29 is additionally connected to each side frame bar 20, 21 by upper and lower gussets designated at 32 and 33, respectively. The upper gusset 32 is L-shaped in cross section and has an upper horizontal part 34 which overlies and is suitably secured to the corresponding end of the U-shaped cross bar 29 and also has a vertical part 35 which is disposed against the face of the liner 21 and secured thereto in any suitable manner. The lower gusset 33 is of generally Z-shape in cross section, having an upper horizontal part 36 suitably secured to the underside of the flanges 30 of the U-shaped crossbar 29, a vertical part 38 arranged parallel with but spaced from the side frame bars 20, 21, and a horizontal part 39 resting on the lower flange of the liner channel 21 and secured thereto in any suitable manner.

The front and rear ends of each gusset 33 are connected to the bracket 40 of a bearing indicated generally at 41 and which bracket comprises a metal cylinder 42 arranged with its axis lengthwise of the frame and a pair of spaced vertical webs 43 connecting this cylinder with an L-shaped attaching bracket 44 the horizontal leg 45 of which is attached by bolts 46 to the underside of the side frame bar 20, 21 and the vertical leg 48 of which is attached by a bolt 49 to the vertical part 38 of the Z-shaped gusset 33. A similar bearing bracket 40 is arranged under each end of the cross bar 25 and which is similarly connected to the frame by a bracket 50 which, as with the gusset 33 and as best shown in Fig. 4, is of general Z-shape in cross section having an upper horizontal part 51 suitably secured to the underside of the cross bar 25, a vertical part 52 arranged parallel with but spaced from the side frame bar 20, 21 and a horizontal part 53 resting on the lower flange of the liner channel 21 and secured thereto in any suitable manner. A similar bearing bracket 40 is arranged adjacent each end of the rear cross bar 22 and is connected to the frame, as best shown in Fig. 6, by a generally U-shaped bracket 54, the horizontal legs of which are suitably secured to the underside of the corresponding gusset 23 and to the lower flange of the liner 21. The vertical part 55 of each bracket 54 is disposed inwardly of and in spaced relation to the corresponding side frame bar 20, 21.

This frame is shown as supported by a pair of tandem axles 60 and 61 which are supported by wheels 62, these wheels being rotatably secured to the axles. One or both groups of wheels can be drive wheels, both axles being shown for this purpose as housing drive shafts 63 connected by the usual differential gears (not shown) and secured to the wheels 62 in the usual and well known manner.

The construction of the tandem axle spring suspension at the left hand side of the truck is the same as the tandem axle spring suspension at the right hand side of the truck and hence a description of the spring suspension at one side of the truck will be deemed to apply to both sides, the same reference numerals being used.

A feature of the invention resides in the use of four rubber shear springs, indicated generally at 65, in the spring suspension to provide the resilient support for the frame 19 on the tandem axles 60, 61. While this number is not critical, each of these rubber shear springs 65 is shown as mounted on the outside of the corresponding side frame bar 20 of the frame approximately opposite a corresponding bearing bracket 41 of the inner pair of these bearings, a pair of these shear rubber springs being thereby arranged at each side of the frame in closely spaced relation to each other and each pair being arranged between the tandem axles 60 and 61. Each of these rubber shear springs 65 is preferably constructed as follows:

The numeral 66 represents a rubber body which is preferably of vertically elongated rectangular cross section lengthwise of the chassis and in opposite vertical section, when the vehicle is unloaded, is of parallelogram form so that its outer face is arranged below its inner face as best shown in Fig. 13. This outer face is vulcanized to a rectangular metal plate 68 the upper part of which is removably secured, as by bolts 69, to a horizontal tie plate or bar 70 in the form of a channel extending lengthwise of the frame with its flanges projecting outwardly. The channel 70 at each side of the vehicle connects the two metal plates 68 of the corresponding pair of rubber shear springs 65.

The inner face of the rubber body 66 of each rubber shear spring is vulcanized to a rectangular metal back plate 71 and it will be noted that the metal back plate 71 extends downwardly beyond the rubber body 66 as illustrated in Fig. 13. The metal back plate 71 of each rubber spring 65 is backed by the T-shaped backing plate 72 shown in perspective in Fig. 16. This backing plate includes an upper cross bar 73 which extends the full width of the back plate 71 of the rubber spring and a narrower vertical bar or tongue 74 narrower than the back plate 71. When the backing plate 72 is placed against the rear face of the back plate 71 of the rubber spring, the narrower width of the vertical tongue or bar 74 provides two exposed vertical marginal rails 75 on the rear face of the back plate 71 as best shown in Fig. 14.

The lower end of the back plate 71 is shown as secured to the lower end of the T-shaped backing plate 72 by a pair of bolts 76, as best illustrated in Figs. 13-16. The upper extremities of these plates are shown as connected together by a pair of bolts 78, these bolts also extending through the adjacent frame side bar or channel 20, its liner 21 and the vertical part 35 of the gusset 34 so as to secure the rubber spring to the frame. The rubber spring is further secured to the frame by a second pair of bolts 79 arranged intermediate the upper and lower pairs of bolts 78 and 76 and extending through the back plate 71 and backing plate 72 of the rubber shear spring and also through the adjacent side frame bar or channel 20, its liner 21 and the vertical part 30 of the supporting bracket 31.

A pair of rollers 80 ride in the tracks 75 provided on the rear face of the back plate 71 for each rubber shear spring by the narrow bar or tongue 74 of the T-shaped backing plate 72. Each of these rollers is journalled on a cross pin 81 and each pair is held in spaced relation by a spacing sleeve 82. The ends of each cross pin extend through apertured ears 83 of a U-shaped bracket 84 and are secured by a pair of nuts 85. The cross part of the U-shaped bracket 84 is disposed against the front face of the front plate 68 of the corresponding rubber shear spring 65 and is shown as secured thereto by a plurality of bolts 86. The yielding support of the rubber shear springs 65 is provided by vertical movement of the front and back plates 68 and 71 vulcanized to each rubber body 66, this movement being illustrated by dotted lines in Fig. 13. With the load transmitted to the upper parts of the front plates 68 by the cross bars 70 the forces are such as to cause the lower ends of the front and back plates 68 and 71 of each rubber shear spring to separate and hence impose an unnecessary stress on the vulcanization bonds between the lower ends of each pair of these plates 68 and 71 and the rubber body 66 therebetween. The rollers 80 carried by the bracket 84 of each front plate 68 and engaging the rear face of the companion back plate 71 obviously prevent the separation of the lower ends of these plates and hence prevent such bond stress.

The suspension includes, for each end of each axle, a crank arm journalled on the frame, and shackles connecting each crank arm with an axle bracket on the corresponding axle end. These parts are generally of the form described in greater detail in my copending application for Spring Suspension, Serial No. 153,932, filed April 4, 1950 and to which reference is made for a more detailed description of these parts.

In general, and referring more particularly to the front tandem axle 60, to each end of this axle is secured an axle bracket 90 which supports an axle pivot pin bar 91 at its upper end. The axle bracket 90 is shown as welded at its lower end to the axle end and the axle pivot pin bar 91 is shown as being of square form in cross section and as removably secured by vertical bolts or screws 92 passing therethrough and anchored in the top of the axle bracket 91.

Each axle pivot pin bar 91 is provided at its opposite ends with generally horizontal, integral axle pivot pins 93 projecting lengthwise of the frame 19. The axle pivot pins 93 of each axle pivot pin bar 91 are arranged in generally parallel relation to each other but are out of line and are angularly disposed with reference to the axis of the axle pivot pin bar 91 and the normal line of movement of the vehicle. These axle pivot pins converge or toe in toward the front of the vehicle, this providing for self steering of the tandem axles as hereinafter discussed in greater detail.

Each of the axle pivot pins 93 is journalled in the bushing or knuckle 94 of a shackle 95. The bearing between each of these axle pivot pins 93 and its shackle can be lubricated through a lubricant fitting 96.

Each shackle 95 is connected at its opposite end by a universal or ball and socket joint, indicated generally at 98, to a crank arm pivot pin 99 at the outer or free end of a crank arm 100. The construction of the ball and socket joint 98 is described in detail in my said copending application Serial No. 153,932 and is not repeated here. Each crank arm pivot pin 99 extends through a pair of spaced ears 101 between which its ball and socket joint 98 is arranged and each crank arm pivot pin 99 is secured to these ears by nuts 102. These ears 101 project horizontally outwardly from the body 103 of the crank arm 100, each body 103 extending lengthwise of the frame and having two pairs of such ears, one at each end, and the pairs of ears of each crank arm being connected by a pair of shackles 95 with the axle pivot pins 93 at the opposite ends of a corresponding axle pivot pin bar 91.

As best shown in Fig. 8, the elongated body 103 of each crank arm 100 is provided at its opposite ends with bosses 104 which project horizontally in the opposite direction from the corresponding pairs of ears 101. These bosses are provided with bores 105 in each of which a fulcrum pivot pin 106 is tightly fitted.

At the remote ends of the pair of crank arms 100 at each side of the frame, these fulcrum pivot pins 106 are relatively short and are fitted in a metal sleeve 108 surrounded by a rubber bushing 109 and having end rings 110 and 111 one of which is pinned, as at 112, to the adjacent boss 104 of the crank arm and the other of which is engaged by a nut 113 at the end of the fulcrum pin 106. Each rubber sleeve 109 is held under compression in the sleeve 42 of the corresponding bearing bracket 41 and permits the necessary degree of oscillation of the corresponding fulcrum pivot pin 106 in its bearing bracket 41.

At the adjacent ends of the pair of crank arms 100 at each side of the frame, the fulcrum pivot pins 114 are relatively long and project beyond a metal sleeve 115 fitted thereon. Each metal sleeve 115 is surrounded by a rubber bushing 116 and has end rings 118 and 119 one of which is pinned, as at 120, to the adjacent boss 104 of the crank arm. Each rubber sleeve 116 is held under compression in the sleeve 42 of the corresponding bearing bracket 41 and permits the necessary degree of oscillation of the corresponding fulcrum pivot pin 114 in its bearing bracket 41.

The ends of each pair of these fulcrum pivot pins 114 are arranged in opposed coaxial relation and each pivot pin has keyed thereto a compensating or load transfer arm 121. Between each pair of compensating arms 121, the ends of the fulcrum pivot pins 114 are journalled in bearings 122 in the tubular cylindrical hub 123 of a pinion carrier indicated generally at 124. Each of these bearings 122 is shown as comprising an inner metal sleeve 125 fitted on a reduced end 126 of the corresponding fulcrum pivot pin 114, an outer metal sleeve 128 fitted in the bore 129 of the corresponding tubular cylindrical hub 123, and a rubber bushing 130 held in compressive relation between the pair of inner and outer sleeves 125 and 128. A tie rod 131 extends loosely through each pair of the coaxial fulcrum pivot pins 114, this fulcrum rod having a head 132 at its end toward the front of the vehicle and a nut 133 at its end toward the rear of the vehicle, this last nut engaging the end of the corresponding fulcrum pin 114. A ball thrust bearing 134 is shown as interposed between the head 132 of each tie rod 131 and the end of the corresponding fulcrum pin 114.

The pinion carrier 124 is provided with a central stem 135 projecting laterally from its tubular cylindrical hub 123, this stem having a blind bore 136 arranged at right angles to the axis of the hub 123. In this bore 136 is fitted a pin 138 which projects outwardly therefrom. This pin 138 is preferably welded in the bore 136 and to this end the socket 135 is bored transversely, as indicated at 139, and through these bores 139 weldments 140 are applied to unite the pin and socket as best shown in Fig. 8.

On the projecting end of each of the pins 138 is mounted a pair of antifriction bearings 141 on which is mounted a pinion 142. The teeth of each pinion mesh with the teeth of a pair of gear segments 143 integral with the corresponding pair of compensating arms 121 and the gear segments being concentric with the axis of these compensating arms. Dust seals 144 and 145 are provided for the hub of each pinion 142. It will be seen that the rotation of one of each pair of crank arms 100 through its fulcrum pivot pin 114, compensating arm 121 and its gear segment 143 and through the pinion 142, tends to rotate the companion crank arm 100 in the opposite direction through its gear segment 143, compensating arm 121 and fulcrum pivot pin 114.

The extreme outer end of each pin 138 for the corresponding pinion 142 is connected to the corresponding pair of rubber shear springs 65 to provide the yielding connection between the axles and the frame. To this end a pressure head 146 is pinned, as indicated at 147, to the outer or free end of each pin 138 beyond its pinion 142 and this pressure head is provided with an upwardly directed angular pressure face 148 which is shown as being flat and as inclining upwardly and outwardly relative to the axis of the pin. The transverse axis of this pressure face is horizontally disposed.

This pressure face engages the lower arcuate pressure face 149 of a pressure transmitting strut 150. This lower arcuate pressure face 149 is in the form of a segment of a cylinder, the axis of which is horizontal and parallel with the fulcrum axis of the adjacent pair of crank arms 100. The pressure strut 150 is provided with a similar upper arcuate pressure face 151 also in the form of a segment of a cylinder with its axis parallel with the axis of the lower pressure face 149. The upper pressure face 151 is smaller and has a greater degree of convexity than the lower arcuate pressure face 149. This upper arcuate pressure face 151 bears against the plane pressure face 152 on the underside of a boss 153 projecting outwardly from the channel or bar 70 connecting the adjacent two rubber springs 65. This pressure face 152 is inclined upwardly and outwardly and its axis lengthwise of the frame is horizontally disposed.

In order to prevent slippage of the pressure strut 150 from between the plane pressure faces 148 and 152, but otherwise having no function in the transmission of pressure to the rubber shear springs 65, the opposing pressure faces 148 and 149 are recessed, as indicated at 154 and 155, to receive a large ball 156 and the opposing pressure faces 151 and 152 are similarly recessed, as indicated at 158 and 159, to receive a smaller ball 160.

In order to prevent any rebound forces from separating the pressure faces it is desirable that the pressure head 146 and boss 153 be tied together. To this end a link 161 is provided. To render this link also effective to protect and conceal the pressure strut 150 as well as to minimize injury to anyone fingering the parts while the vehicle is being loaded or unloaded, this link is preferably of U-form in cross section with its side flanges flanking the pressure strut 150. A pivot pin 162 extends through the upper ends of these side flanges and through a bore 163 in the boss 153 parallel with the axes of the arcuate pressure faces 149 and 151 and through a rubber bushing 164 in this bore. This bore 163 is preferably arranged above and slightly to the outside of the ball 160. A pivot pin 165 extends through the lower ends of these side flanges and through a bore 166 in the pressure head 146 parallel with the axes of the arcuate pressure faces 149 and 151 and through a rubber bushing 168 in this bore. This bore 166 is preferably so arranged that the line of pressure of the pressure strut 150 swings through the axis of this pivot pin in the operation of the suspension.

In the operation of the suspension the upward movement of one end of, say, the front axle 60, through the corresponding axle bracket 90, pin bar 91 and axle pivot pins 93, moves the corresponding pair of shackles 95 upwardly so as to swing the outer end of the crank arm 100 upwardly. This rotates this crank arm 100 about its fulcrum pivot pins 106 and 114 and also swings the corresponding compensating arm 121 keyed to the longer fulcrum pin 114 of the crank arm upwardly. The gear segment 143 at the outer end of this compensating arm 121 so moved upwardly rotates its pinion 142 in a direction to impress a downward pressure on the companion gear segment 143 of the compensating arm 121 of the rear axle 61. This downward pressure of this companion compensating arm 121 is transmitted to the companion end of the rear axle 61 through the elongated fulcrum pin 114, crank arm 100, shackles 95 and axle bracket 90 fast to this companion end of the rear axle. Accordingly it will be seen that with the present invention there is a load transfer from each end of each tandem axle to the companion end of the other tandem axle whenever there is a differential in upward movement of the axles so that the load is always shared by the companion ends of the two tandem axles.

Under the assumed operation, that is with one end of the front tandem axle moving upwardly with the other wheels on the ground, the compensating arm 121 and gear segment 143 of the companion end of the rear tandem axle 61 is, of course, held stationary and hence the upward movement of the compensating arm 121 and gear segment 143 associated with the end of the front tandem axle moving upwardly causes its pinion 142 to travel up the teeth of the stationary gear segment 143 of the companion end of the rear tandem axle 61. This upward movement of the pinion 142 causes its pin 138 and stem 135 to swing upwardly about the bearings 122 on the reduced ends 126 of the fulcrum pins 114 of the two companion crank arms 100. Through the pressure head 146 on this pin 138, this upward movement is transmitted through the pressure strut 150 to the boss 153 of the horizontal connecting bar or channel 70 at the corresponding side of the vehicle.

The opposite ends of this fore-and-aft connecting bar or channel 70 are connected to the front plates 68 of the companion pair of the rubber springs 65 and hence this movement is transmitted to the rubber bodies 66 of these springs. Since the back plates 71 of these rubber springs are fixed through the T-shaped backing plate 72 to the vehicle frame 19, this upward movement of the outer plates 68 of these rubber springs places these rubber bodies under vertical shear stress, these rubber bodies providing the resilient resistance to the assumed upward movement of one end of the front tandem axle 60.

Since the upward pressure is impressed on the front plates 68 of the pair of rubber springs 65 under consideration by the fore-and-aft bar or channel 70 connecting these plates, this upward pressure, in the absence of provision to prevent it, would tend to separate the lower ends of these front plates 68 from the back plates 71 of the rubber springs and hence tend to destroy the vulcanization bond between the lower ends of these rubber bodies 66 and their front and back plates 68 and 71. To prevent such bond stress the pair of rollers 80 connected through the brackets 84 with the front plates 68 of these rubber springs 65 ride on the rails 75 provided on the back plates 71 of these rubber springs 65 by the T-shaped backing plate 72. These rollers prevent separation of the lower end of each front plate 68 from the lower end of the corresponding back plate 71 and hence prevent such bond stress.

In the unloaded condition of the truck the rubber bodies 66 of the rectilinear shear springs 65 are in the full line position shown in Fig. 13 in which the front plates 68 thereof are arranged below the companion back plates 71 and the cross section of the rubber body, transversely of the vehicle, is in the form of a downwardly and outwardly inclining parallelogram. In the normal loaded condition of the truck the front plates 68 of the rectilinear shear springs 65 have been moved upwardly to the first dotted line position shown in Fig. 13 in which position the rubber bodies 66 have been distorted so as to be of rectangular form in cross section, transversely of the vehicle. Under extreme load conditions, as when both axles are moved upwardly on encountering bumps in the road, and when fully loaded, the front plates 68 of the rectilinear shear springs move upwardly to the extreme dotted line position shown in Fig. 13 in which the rubber bodies 66 have been stressed to have a cross section, transverse of the vehicle, in the form of an outwardly and upwardly inclining parallelogram. When the load or pressure imposed upon the rubber bodies 66 of the pair of rectilinear shear outwardly and upwardly inclining parallelogram. When the load or pressure imposed upon the rubber bodies 66 of the pair of rectilinear shear springs 65 at each side of the vehicle is relieved, these rubber bodies tend to assume the full line position shown in Fig. 13.

A feature of the invention resides in the action of the pressure struts 150 as illustrated in Figs. 9–12. In the normal unloaded condition of the truck, as illustrated in Fig. 11, the line of contact between the faces 149 and 148 of the pressure strut 150 and pressure head 146, respectively, is remote from the frame 19. Smilarly the line of contact between the faces 151 and 152 of the pressure strut 150 and boss 153, respectively, is close to the frame 19.

Starting with the unloaded or free spring condition shown in Fig. 12, as the truck is loaded the stem 135 and its pin 138 and pressure head 146 move upwardly about the axis of the fulcrum pins 114 and 106 and the arcuate face 149 of the pressure strut 150 rolls upon the flat face 148 of the pressure head 146 so that the line of contact between these faces moves outwardly away from the frame 19 as llustrated by comparing the unloaded position, Fig. 12, with the normally loaded position, Fig. 10, this normally loaded position being also illustrated in Fig. 9. The arcuate face 151 of the pressure strut 150 rolls upon the flat face 152 of the boss 153 so that the line of contact between these faces moves away from the frame 19.

When maximum load is encountered, as illustrated in Fig. 11, the arcuate face 149 of the pressure strut 150 rolls to the outer extremity of the flat face 148 on the pressure head 146 so that the line of contact between these faces moves still further from the frame 19. The line of pressure between the arcuate face 151 of the pressure strut 150 and the flat face 152 of the boss 153 moves still further from the frame 19.

It will be noted that a pure rolling action is provided between the arcuate faces 149 and 151 of the pressure strut 150 and the flat faces 148 and 152 of the pressure head 146 and boss 153, respectively. The balls 156 and 160 do not function in this transmission of pressure and merely serve to keep the pressure strut 150 in proper alinement with the pressure faces 148 and 152 of the pressure head 146 and boss 153. Similarly the U-shaped link 161 does not function in the transmission of pressure but merely serves to prevent separation of the pressure head 146 from the boss 153 as might occur under rebound action. The rubber bushings 164 and 168 for this link 161 permit such slight differential movement of the pivots 162 and 165 relative to the lines of contact of the pressure faces 151 and 149 of the compression strut 150 as may occur. The U-shaped form of this link 161 also in part encloses the pressure strut 150 both to protect it and also to protect against possible injury to anyone fingering the suspension while it is working.

It will be noted that the shackles 95 are inclined upwardly and inwardly from their respective crank arm pivot pins 99 to the corresponding axle pivot pins 93. This upward and inward inclined arrangement of the shackles tends to cause each axle to centralize itself in a direction transverse of the frame and enables the action of gravity to geometrically and resiliently resist any movement of either axle away from its central position. This permits the vehicle frame 19 to move substantially straight ahead despite a certain amount of lateral movement of the axles. This arrangement of the shackles further provides high and wide pivot positions which provide increased stability in that these high and wide pivot positions provide effective spring centers which can be as wide or wider than the track of the vehicle. Further, this arrangement reduces side sway, the high and wide pivot positions, together with the upward and inward slant of the shackles, providing a suspension in which the frame is more nearly suspended than mounted. Other important advantages which flow from the inclined arrangement of the shackles as shown are the reduction in the possibility of wheel tramp and in the elimination of the need for antibody-roll devices, such as torsion bar stabilizers.

The oblique position of the axes of the axle pivot pins 93 of the pin bar 91 on each axle causes either wheel 62 to move freely a short distance rearwardly whenever said wheel rises and, concomitantly, causes this wheel to move a short distance forwardly whenever said wheel falls. This enables the peripheral speed of the wheel to be maintained substantially constant when traveling over irregularities in the road, and, at the same time, enables the axle of the wheel to receive the sudden horizontal thrusts which inevitably result as a consequence of the uniform peripheral speed of the wheel, without imparting these thrusts directly to the frame.

When the vehicle is traveling straight ahead, if the tandem axles 60, 61 are not parallel for any reason, they will automatically assume a parallel position because of the fact that if, for example, the rear axle 61 is out of line it will tend to follow a horizontal arc and this tendency, due to the lateral friction between the tires and the roadway, will cause a lateral movement of the axle relative to the frame. Due to the fact that the shackles 95 normally extend upwardly and inwardly, this lateral movement is automatically caused to be translated into a slight turning movement, in a horizontal plane, of the whole axle, and this turning movement will continue until both the tandem axles are in line with each other. Such a movement, naturally, causes a change in the angularity of the shackles 95 at the opposite end of each axle and this change is resisted by gravity which, due to the obliquity of the shackles, is caused to act in a geometric manner. This obliquity of the axle pivot pins 93 is preferably such that when one of the tandem axles moves axially its maximum extent, the wheel 62 at one end thereof will move forwardly about ¾ of an inch and the wheel 62 at the opposite end thereof will move rearwardly about ¾ of an inch.

Due to the obliquity or toeing in of the axle pivot pins 93 the tandem axles 60, 61 are rendered self-steering when making a turn in the road. Thus, these axles tend to trail or follow each other when making a turn in the road as well as when going straight ahead. In making a turn, just as when going straight ahead, the tires naturally tend to resist lateral scuffing and tend to push the axles laterally and, as a consequence, each axle moves obliquely to eliminate scuffing. Thus, when the vehicle is making a turn the two rear axles are caused to move automatically to such an oblique position, relatively to each other, as will cause their axes to intersect the axis of revolution of the two front wheels, and enables the vehicle to make the turn without tire scuffing. This action occurs when either the vehicle is steered around a long turn in the road or when it is steering sharply on a smooth road, as, for instance, when passing a slow vehicle or otherwise avoiding some obstruction. Either axle also tends to assume a slight oblique position when a tendency to tire scuffing occurs because of one wheel or a pair of wheels at one end of either axle has a diameter different from the wheel or pair of wheels at the other end of the same axle. Accordingly, tire scuffing when tires of different diameters are used is reduced by the practice of the present invention.

To provide such automatic steering and at the same time reduce the space required for the suspension between the body and the tires for accommodation of the suspension, the axle pivot pins 93 of each pivot pin bar 91, while parallel, are arranged out of line with each other so as to reduce the space requirement between the frame and each tire of the tandem axle suspension to accommodate these pivot pins and the shackles and crank arm which they connect. With the pivot pins 93 of each pivot pin bar out of line, the shackles 95 necessarily twist slightly relative to the crank arms 100 as they move vertically with their axle and hence the ball and socket joints 98 are required between each shackle 95 and its crank arm 100. However, this arrangement of the angular pivot pins 93 and the inclusion of the ball and socket joints 98 permits the suspension to be used with trucks having a wide frame and large tires.

It will particularly be noted that as the line contact between the faces 148 and 149 of the pressure head 146 and pressure strut 150 moves inwardly on increase of load (Figs. 11, 10, and 12) the effective length of the lever arm comprising the pinion carrier 124 and pressure head 146 decreases. Conversely, of course, on decreasing load the effective length of this lever arm increases. This provides a variable rate spring suspension in that there is decreasing leverage as the load is increased and hence the rubber springs 65 are compressed more readily as the load increases. The variable rate spring action so provided by the changing effective length of this lever arm is not effected by the moving line of contact between the surfaces 151 and 152 of the pressure strut 150 and boss 153, respectively.

From the foregoing it will be seen that the present invention provides a tandem axle suspension in which the resilience is provided by rubber bodies subjected to a rectilinear shear action and at the same time provides a suspension in which there is a load transfer from one axle end to the companion axle end so as to equalize the load on both axles; in which the axles tend to aline themselves and also are self-steering so as to move to such angularity as avoids tire scuffing when making a turn in the road; and in which the unsprung weight is reduced to a very low value. It will further be seen that this suspension is simple and compact, considering the function which it performs; is adapted to vehicles having wide bodies and large tires; and accomplishes the various other objectives set forth.

By "rubber" as used in the accompanying claims is meant both natural rubber and also synthetic rubber and mixtures of natural and synthetic rubber.

I claim:

1. In a tandem axle vehicle spring suspension adapted to be interposed between a vehicle frame and a pair of tandem axles each having wheels journalled on the ends thereof and said suspension having a load transfer mechanism at each side of said frame pivotally connecting the corresponding ends of said axles and arranged to equalize the loads on said ends, the combination therewith of a resilient support for said frame, comprising a pair of rubber blocks spaced lengthwise of said frame and arranged adjacent each of said load transfer mechanisms, means securing one face of each rubber block to said frame in position to permit flexure of said block and vertical movement of the opposite face thereof, a metal plate bonded to said opposite face of each rubber block, a horizontal bar connecting the plates of each pair of rubber blocks, and means operatively connecting each of said bars with the corresponding load transfer mechanism.

2. In a tandem axle vehicle spring suspension adapted to be interposed between a vehicle frame and a pair of tandem axles each having wheels journalled on the ends thereof and said suspension having a load transfer mechanism at each side of said frame pivotally connecting the corresponding ends of said axles and arranged to equalize the loads on said ends, the combination therewith of a resilient support for said frame, comprising a pair of rubber blocks spaced lengthwise of said frame and arranged adjacent each of said load transfer mechanisms, means securing one face of each rubber block to said frame in position to permit flexure of said block and vertical movement of the opposite face thereof, a metal plate bonded to said opposite face of each rubber block, a horizontal bar connecting the plates of each pair of rubber blocks and a vertical pressure strut operatively connecting each of said bars with the corresponding load transfer mechanism.

3. In a tandem axle vehicle spring suspension adapted to be interposed between a vehicle frame and a pair of tandem axles each having wheels journalled on the ends thereof and said suspension having a load transfer mechanism at each side of said frame pivotally connecting the corresponding ends of said axles and arranged to equalize the loads on said ends, the combination therewith of a resilient support for said frame, comprising a rubber block arranged above each of said load transfer mechanisms and intermediate said frame and wheels, means securing one face of each rubber block to said frame in position to permit flexure of said block and vertical movement of the opposite face thereof, a metal plate bonded to said opposite face of each rubber block, and a vertical pressure strut operatively connecting each of said plates with the corresponding load transfer mechanism.

4. In a tandem axle vehicle spring suspension adapted to be interposed between a vehicle frame and a pair of tandem axles each having wheels journalled on the ends thereof and said suspension having a load transfer mechanism at each side of said frame pivotally connecting the corresponding ends of said axles and arranged to equalize the loads on said ends, the combination therewith of a resilient support for said frame, comprising a rubber block arranged above each of said load transfer mechanisms and intermediate said frame and wheels, means securing one face of each rubber block to said frame in position to permit flexure of said block and vertical movement of the opposite face thereof, a metal plate bonded to said opposite face of each rubber block, a vertical pressure strut operatively connecting each of said plates with the corresponding load transfer mechanism, and a vertical link alongside each strut and pivotally connecting the adjacent plate and load transfer mechanism to prevent separation of said pressure struts from said plates and load transfer mechanisms under rebound reactions of the suspension.

5. In a tandem axle vehicle spring suspension adapted to be interposed between a vehicle frame and a pair of tandem axles each having wheels journalled on the ends thereof and said suspension having a load transfer mechanism at each side of said frame pivotally connecting the corresponding ends of said axles and arranged to equalize the loads on said ends, the combination therewith of a resilient support for said frame, comprising a rubber block arranged above each of said load transfer mechanisms and intermediate said frame and wheels, means securing one face of each rubber block to said frame in position to permit flexure of said block and vertical movement of the opposite face thereof, a metal plate bonded to said opposite face of each rubber block, a vertical pressure strut operatively connecting each of said plates with the corresponding load transfer mechanism, and a vertical link alongside each strut and pivotally connecting the adjacent plate and load transfer mechanism to prevent separation of said pressure struts from said plates and load transfer mechanisms under rebound reactions of the suspension, said links each having flanges at least in part enclosing the companion strut.

6. In a tandem axle vehicle spring suspension adapted to be interposed between a vehicle frame and a pair of tandem axles each having wheels journalled on the ends thereof and said suspension having a load transfer mechanism at each side of said frame pivotally connecting the corresponding ends of said axles and arranged to equalize the loads on said ends, the combination therewith of a resilient support for said frame, comprising a rubber block arranged above each of said load transfer mechanisms and intermediate said frame and wheels, means securing one face of each rubber block to said frame in position to permit flexure of said block and vertical movement of the opposite face thereof, a metal plate bonded to said opposite face of each rubber block, a vertical pressure strut operatively connecting each of said plates with the corresponding load transfer mechanism, a vertical link arranged alongside each strut, a pivot pin embraced by a rubber bushing connecting the upper end of each link with the corresponding plate, and a pivot pin embraced by a rubber bushing connecting the lower end of each link with the corresponding load transfer mechanism, said links preventing separation of said pressure struts from said plates and load transfer mechanisms under rebound reactions of the suspension.

7. In a tandem axle vehicle spring suspension adapted to be interposed between a vehicle frame and a pair of tandem axles each having wheels journalled on the ends thereof and said suspension having a load transfer mechanism at each side of said frame pivotally connecting the corresponding ends of said axles and arranged to equalize the loads on said ends, the combination therewith of a resilient support for said frame, comprising a rubber block arranged above each of said load transfer mechanisms and intermediate said frame and wheels, a back plate bonded to the vertical side of each of said rubber blocks facing said frame, means securing each back plate to said frame in position to permit vertical flexure of its rubber block and vertical movement of the side of its rubber block opposite said back plate, a front plate bonded to said opposite side of each rubber block, a vertical pressure strut operatively connecting the upper part of each of said front plates with the corresponding load transfer mechanism, and means preventing separation of the lower ends of said plates of each rubber block, comprising a roller on one of said plates and a vertical track on the other of said plates and on which said roller rides.

8. In a tandem axle vehicle spring suspension adapted to be interposed between a vehicle frame and a pair of tandem axles each having wheels journalled on the ends thereof and said suspension having a load transfer mechanism at each side of said frame pivotally connecting the corresponding ends of said axles and arranged to equalize the loads on said ends, the combination therewith of a resilient support for said frame, comprising a rubber block arranged above each of said load transfer mechanisms intermediate said frame and wheels, a vertical back plate bonded to the vertical side of each of said rubber blocks facing said frame, a T-shaped backing plate secured to the face of each back plate opposing said frame and having a vertical tongue providing marginal tracks along the vertical edges of each back plate and facing said frame, means arranged to secure each T-shaped backing plate to said frame in position to permit vertical flexure of the rubber block associated therewith and vertical movement of the side of said rubber block opposite said back plate, a front plate bonded to said opposite side of each rubber block, a vertical pressure strut operatively connecting the upper part of each of said front plates with the corresponding load transfer mechanism, and means preventing separation of the lower ends of the plates of each rubber block, comprising ears at the sides of each of said front plates and arranged alongside the corresponding back plate, a pin connecting each pair of said ears and arranged on the side of the back plate remote from the corresponding front plate, and rollers on each of said pins and riding on the corresponding pair of said tracks.

9. A tandem axle vehicle spring suspension adapted to be interposed between a vehicle frame and a pair of tandem axles each having wheels journalled on the ends thereof, comprising a normally generally horizontal crank arm arranged above each end of each axle and journalled on said frame to swing about a fulcrum axis extending lengthwise of said frame, a shackle connecting the free end of each crank arm with the adjacent axle end, a pair of gears with opposing teeth at each side of the vehicle and each fast to one of the opposing ends of a corresponding crank arm concentric with said fulcrum axis thereof, a pinion carrier journalled to swing about an axis concentric with each fulcrum axis and arranged at the opposing ends of the corresponding pair of said crank arms, a pinion journalled on the free end of each of said pinion carriers and meshing with the opposing teeth of the adjacent pair of said gears, and means on said frame and yieldingly resisting upward movement of said free end of each of said pinion carriers, comprising a pressure head mounted on the free end of each pinion carrier and having an upwardly directed pressure face, a pressure strut having a downwardly directed pressure face engaging said pressure face of each pressure head and having an upwardly directed pressure face at its upper end, a spring abutment member above each pinion carrier and having a downwardly directed pressure face engaging said upwardly directed pressure face of the corresponding pressure strut, and yielding means connecting each of said spring abutment members and said frame and guiding each spring abutment member to move vertically relative to said frame.

10. A tandem axle vehicle spring suspension adapted to be interposed between a vehicle frame and a pair of tandem axles each having wheels journalled on the ends thereof, comprising a normally generally horizontal crank arm arranged above each end of each axle and journalled on said frame to swing about a fulcrum axis extending lengthwise of said frame, a shackle connecting the free end of each crank arm with the adjacent axle end, a pair of gears with opposing teeth at each side of the vehicle and each fast to one of the opposing ends of a corresponding crank arm concentric with said fulcrum axis thereof, a pinion carrier journalled to swing about an axis concentric with each fulcrum axis and arranged at the opposing ends of the corresponding pair of said crank arms, a pinion journalled on the free end of each of said pinion carriers and meshing with the opposing teeth of the adjacent pair of said gears, and means on said frame and yieldingly resisting upward movement of said free end of each of said pinion carriers, comprising a pressure head fixed to the free end of each pinion carrier and having an upwardly directed pressure face, a pressure strut having a convex arcuate downwardly directed pressure face curving about an axis generally parallel with the adjacent fulcrum pins and having rolling engagement with the pressure face of the corresponding pressure head, each pressure strut also having a convex arcuate upwardly directed pressure face curving about an axis generally parallel with the adjacent fulcrum pins, an abutment member above each pinion carrier and having a downwardly directed pressure face having rolling engagement with said upwardly directed pressure face of the corresponding pressure strut, and yielding means connecting each of said spring abutment members and said frame and guiding each spring abutment member to move vertically relative to said frame.

11. A tandem axle vehicle spring suspension adapted to be interposed between a vehicle frame and a pair of tandem axles each having wheels journalled on the ends thereof, comprising a normally generally horizontal crank arm arranged above each end of each axle and journalled on said frame to swing about a fulcrum axis extending lengthwise of said frame, a shackle connecting the free end of each crank arm with the adjacent axle end, a pair of gears with opposing teeeth at each side of the vehicle and each fast to one of the opposing ends of a corresponding crank arm concentric with said fulcrum axis thereof, a pinion carrier journalled to swing about an axis concentric with each fulcrum axis and arranged at the opposing ends of the corresponding pair of said crank arms, a pinion journalled on the free end of each of said pinion carriers and meshing with the opposing teeth of the adjacent pair of said gears, and means on said frame and yieldingly resisting upward movement of said free end of each of said pinion carriers, comprising a pressure head fixed to the free end of each pinion carrier and having an upwardly directed pressure face, a pressure strut having a convex arcuate downwardly directed pressure face curving about an axis generally parallel with the adjacent fulcrum pins and having rolling engagement with the pressure face of the corresponding pressure head, each pressure strut also having a convex arcuate upwardly directed pressure face curving about an axis generally parallel with the adjacent fulcrum pins, an abutment member above each pinion carrier and having a downwardly directed pressure face having rolling engagement with said upwardly directed pressure face of the corresponding pressure strut each of said pressure faces being provided with a recess and said recesses of each pair of contacting faces being in register with each other, an alinement member in each registering pair of said recesses and bridging the corresponding pair of said contacting faces, and yielding means connecting each of said spring abutment members and said frame and guiding each spring abutment member to move vertically relative to said frame.

12. A tandem axle vehicle spring suspension adapted to be interposed between a vehicle frame and a pair of tandem axles each having wheels journalled on the ends thereof, comprising a normally generally horizontal crank arm arranged above each end of each axle and journalled on said frame to swing about a fulcrum axis extending lengthwise of said frame, a shackle connecting the free end of each crank arm with the adjacent axle end, a pair of gears with opposing teeth at each side of the vehicle and each fast to one of the opposing ends of a corresponding crank arm concentric with said fulcrum axis thereof, a pinion carrier journalled to swing about an axis concentric with each fulcrum axis and arranged at the opposing ends of the corresponding pair of said crank arms, a pinion journalled on the free end of each of said pinion carriers and meshing with the opposing teeth of the adjacent pair of said gears, and means on said frame and yieldingly resisting upward movement of said free end of each of said pinion carriers, comprising a pressure head mounted on the free end of each pinion carrier and having an upwardly directed pressure face, a pressure strut having a downwardly directed pressure face engaging said pressure face of each pressure head and having an upwardly directed pressure face at its upper end, a spring abutment member above each pinion carrier and having a downwardly directed pressure face engaging said upwardly directed pressure face of the corresponding pressure strut, yielding means connecting each of said spring abutment members and said frame and guiding each spring abutment member to move vertically relative to said frame, and means preventing separation of each pressure head and its spring abutment member from the pressure strut therebetween under rebound reactions of said suspension, comprising a vertical link associated with each strut, a pivot pin connecting the upper part of each link with the corresponding spring abutment member, and a second pivot pin connecting the lower part of each link with the corresponding pressure head.

13. A tandem axle vehicle spring suspension adapted to be interposed between a vehicle frame and a pair of tandem axles each having wheels journalled on the ends thereof, comprising a normally generally horizontal crank arm arranged above each end of each axle and journalled on said frame to swing about a fulcrum axis extending lengthwise of said frame, a shackle connecting the free end of each crank arm with the adjacent axle end, a pair of gears with opposing teeth at each side of the vehicle and each fast to one of the opposing ends of a corresponding crank arm concentric with said fulcrum axis thereof, a pinion carrier journalled to swing about an axis concentric with each fulcrum axis and arranged at the opposing ends of the corresponding pair of said crank arms, a pinion journalled on the free end of each of said pinion carriers and meshing with the opposing teeth of the adjacent pair of said gears, and means on said frame and yieldingly resisting upward movement of said free end of each of said pinion carriers, comprising a pressure head mounted on the free end of each pinion carrier and having an upwardly directed pressure face, a pressure strut having a downwardly directed pressure face engaging said pressure face of each pressure head and having an upwardly directed pressure face at its upper end, a spring abutment member above each pinion carrier and having a downwardly directed pressure face engaging said upwardly directed pressure face of the corresponding pressure strut, yielding means connecting each of said spring abutment members and said frame and guiding each spring abutment member to move vertically relative to said frame, and means preventing separation of each pressure head and its spring abutment member from the pressure strut therebetween under rebound reactions of said suspension, comprising a vertical link having vertical side flanges embracing the corresponding pressure strut, a pivot pin connecting the upper part of each link with the corresponding spring abutment member, a second pivot pin connecting the lower part of each link with the corresponding pressure head, and a rubber bushing embracing at least one of said pins and providing a yielding connection between said one of said pins and one of the two parts connected thereby.

14. A tandem axle vehicle spring suspension adapted to be interposed between a vehicle frame and a pair of tandem axles each having wheels journalled on the ends thereof, comprising a normally generally horizontal crank arm arranged above each end of each axle and journalled on said frame to swing about a fulcrum axis extending lengthwise of said frame, a shackle connecting the free end of each crank arm with the adjacent axle end, a pair of gears with opposing teeth at each side of the vehicle and each fast to one of the opposing ends of a corresponding crank arm concentric with said fulcrum axis thereof, a pinion carrier journalled to swing about an axis concentric with said fulcrum axis and arranged at the opposing ends of the corresponding pair of said crank arms, a pinion journalled on the free end of each of said pinion carriers and meshing with the opposing teeth of the adjacent pair of said gears, a rubber block in vertically spaced relation to each pinion carrier, means securing one vertical face of each rubber block to said frame in position to permit flexure of said block and vertical movement of the opposite vertical face thereof, and means operatively connecting said opposite vertical face of each rubber block to the corresponding pinion carrier.

ALBERT F. HICKMAN.

References Cited in the file of this patent

UNITED STATES PATENTS

| Number | Name | Date |
| --- | --- | --- |
| 2,193,567 | Pointer | Mar. 12, 1940 |
| 2,216,715 | Ledwinka | Oct. 1, 1940 |
| 2,401,766 | Larison | June 11, 1946 |
| 2,435,199 | Buckendale | Feb. 13, 1948 |
| 2,469,566 | Low | May 10, 1949 |